(12) United States Patent
Wu et al.

(10) Patent No.: US 8,599,075 B2
(45) Date of Patent: Dec. 3, 2013

(54) HOUSING OF PORTABLE ELECTRONIC DEVICE AND METHOD FOR MAKING THE SAME

(75) Inventors: Kun-Tsan Wu, Shindian (TW); Li-Wen Tien, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 414 days.

(21) Appl. No.: 12/967,153

(22) Filed: Dec. 14, 2010

(65) Prior Publication Data
US 2012/0038518 A1 Feb. 16, 2012

(30) Foreign Application Priority Data

Aug. 12, 2010 (CN) .......................... 2010 1 0251931

(51) Int. Cl.
*H01Q 1/24* (2006.01)
(52) U.S. Cl.
USPC .......................................... 343/702; 343/873
(58) Field of Classification Search
USPC ....................... 343/700 MS, 702, 873; 29/600
See application file for complete search history.

(56) References Cited

U.S. PATENT DOCUMENTS

| | | | | |
|---|---|---|---|---|
| 8,432,328 B2* | 4/2013 | Yang et al. | ..................... | 343/878 |
| 8,462,054 B2* | 6/2013 | Yang et al. | ..................... | 343/702 |
| 8,497,812 B2* | 7/2013 | Harokopus et al. | ........... | 343/872 |
| 2002/0080076 A1* | 6/2002 | Kamei et al. | ........... | 343/700 MS |
| 2009/0015490 A1* | 1/2009 | Honda et al. | .................. | 343/702 |

* cited by examiner

*Primary Examiner* — Tan Ho
(74) *Attorney, Agent, or Firm* — Altis & Wispro Law Group, Inc.

(57) ABSTRACT

A housing includes a base and an antenna radiator. The base includes a first injection layer and a second injection layer. The first and second injection layers are formed by injecting of moldable plastic and combining to each other. The antenna radiator is sandwiched between the first and second injection layers by insert molding. The antenna radiator is at least partly covered by the first and second injection layer. The antenna radiator includes a plurality of hills and a plurality of valleys defined between adjacent hills. The antenna radiator includes at least two conducting layers and at least one dielectric layer, and adjacent conducting layers electrically are connected to each other and are separated by the dielectric layer.

14 Claims, 6 Drawing Sheets

HOUSING OF PORTABLE ELECTRONIC DEVICE AND METHOD FOR MAKING THE SAME

This application is one of the three related co-pending U.S. patent applications listed below. All listed applications have the same assignee and were concurrently filed herewith. The disclosure of each of the listed applications is incorporated by reference into all the other listed applications.

| Attorney Docket No. | Title | Inventors |
|---|---|---|
| 12/967,150 | HOUSING OF PORTABLE ELECTRONIC DEVICE AND METHOD FOR MAKING THE SAME | Fan et al. |
| 12/967,151 | HOUSING OF PORTABLE ELECTRONIC DEVICE AND METHOD FOR MAKING THE SAME | Wu et al. |
| 12/967,153 | HOUSING OF PORTABLE ELECTRONIC DEVICE AND METHOD FOR MAKING THE SAME | Wu et al. |

BACKGROUND

1. Technical Field

The present disclosure relates to housings of portable electronic devices, especially to a housing having a three-dimensional antenna formed thereon and a method for making the housing.

2. Description of Related Art

Portable electronic devices, such as mobile phones, personal digital assistants (PDAs) and laptop computers are widely used. Most of these portable electronic devices have antenna modules for receiving and sending wireless signals. A typical antenna includes a thin metal radiator element mounted to a support member, and attached to a housing. However, the radiator element is usually exposed from the housing, and may be easily damaged. In addition, the radiator element and the support member occupy precious space. To solve this problem, a conductive ink is formed on the housing to form the antenna by a screen-printing method. However, this method is usually used to manufacture two-dimensional antennas, and the function of the antenna is limited.

Therefore, there is room for improvement within the art.

BRIEF DESCRIPTION OF THE DRAWINGS

Many aspects of the exemplary embodiment of a portable electronic device can be better understood with reference to the following drawings. The components in the drawings are not necessarily drawn to scale, the emphasis instead being placed upon clearly illustrating the principles of the portable electronic device. Moreover, in the drawings, like reference numerals designate corresponding parts throughout the several views, in which.

DETAILED DESCRIPTION

The disclosure is illustrated by way of example and not by way of limitation in the accompanying drawings. It should be noted that references to "an" or "one" embodiment in this disclosure are not necessarily to the same embodiment, and such references can include the meaning of "at least one" embodiment where the context permits.

Figure 1:
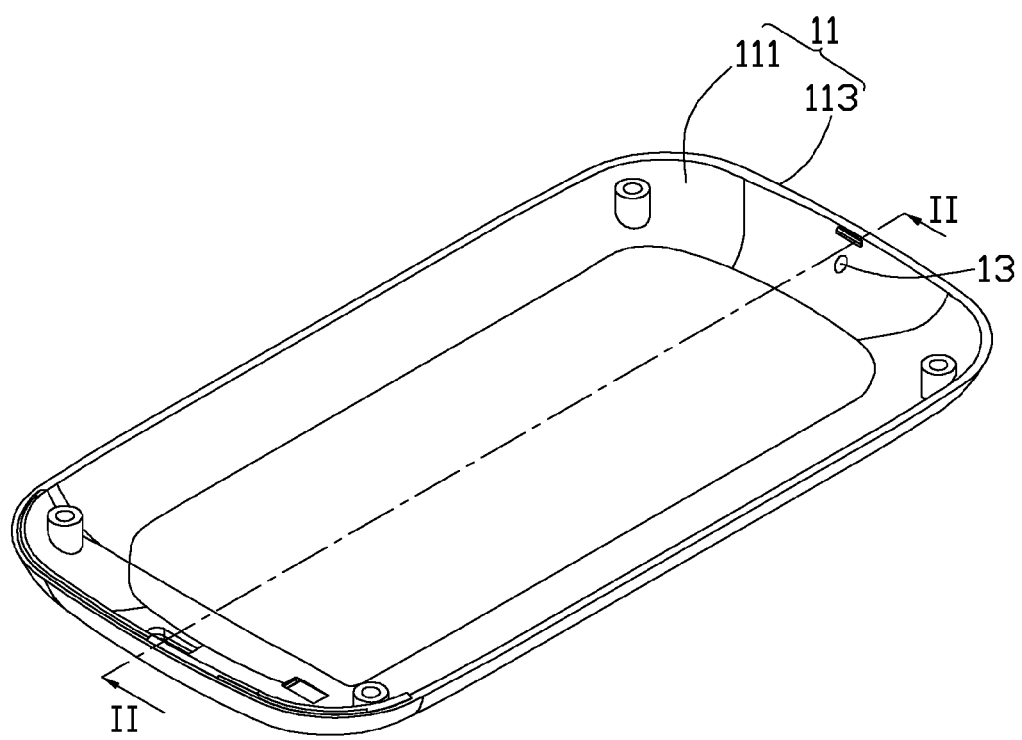
FIG. 1 is a schematic view of a housing of a first embodiment.
Figure 2:
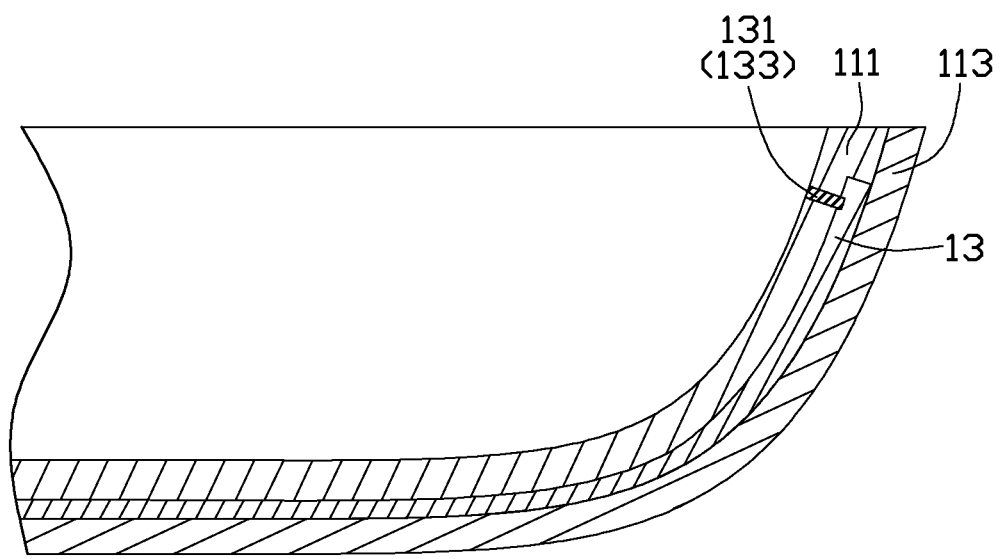
FIG. 2 is a cross-sectional view of a portion of the housing taken along line II-II of FIG. 1.

FIGS. 1 and 2 show an exemplary embodiment of a housing 10 for an electronic device where an antenna is desired, such as mobile phone, notebook, and so on. The housing 10 includes a base 11 and an antenna radiator 13. The base 11 includes a first injection layer 111 and a second injection layer 113. The antenna radiator 13 is sandwiched between the first injection layer 111 and the second injection layer 1113 by insert molding. The antenna radiator 13 includes a first connecting port 131 and a second connecting port 133. Both the first and second connecting ports 131 and 133 run through the first injection layer 111 and are exposed from the base 11, so that the antenna radiator 13 can be electrically connected to the main board (not shown) of the electronic device. The antenna radiator 13 is a multi-layer film antenna, a number of peaks 135 (see FIGS. 5 and 6) and a number of valleys 137 between adjacent peaks 135 are defined during insert molding to increase a length of the antenna radiator 13.

Referring to FIG. 2, the first injection layer 111 and the second injection layer 113 may be made of moldable plastic. The moldable plastic may be one or more thermoplastic materials selected from a group consisting of polypropylene (PP), polyamide (PA), polycarbonate (PC), polyethylene terephthalate (PET), and polymethyl methacrylate (PMMA).

Figure 3:
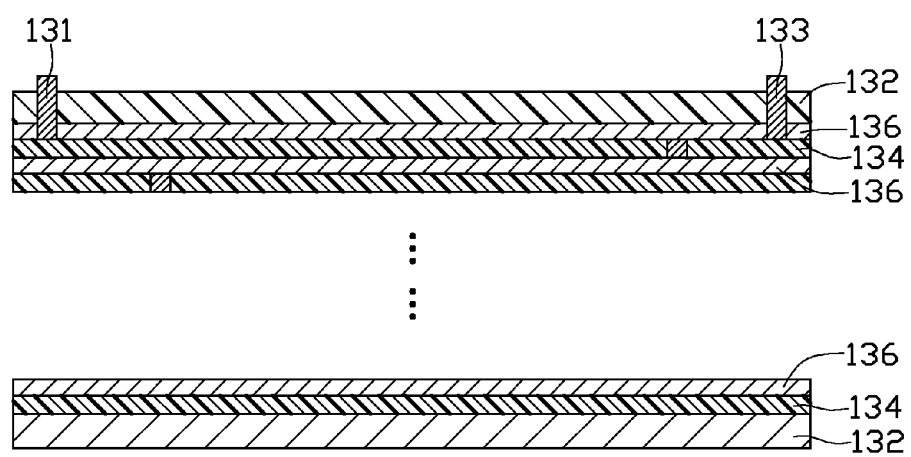
FIG. 3 is a cross-sectional view of a part of an antenna radiator of FIG. 2.

Referring to FIG. 3, the antenna radiator 13 includes two substrate layers 132, a number of conducting layers 136, and a number of dielectric layers 134. The conducting layers 136 and the dielectric layers 134 are alternatively disposed. The first, second connecting ports 131, 133 run through the upper substrate layer 132 and are electrically connected to the conducting layer 136 adjacent to the upper substrate layer 132. The substrate layers 132 are oriented at opposite sides of the antenna radiator 13. The adjacent conducting layers 136 are electrically connected to each other and are separated by the dielectric layers 134. The substrate layers 132 may be made of thermoplastics, such as arylonitrile butadiene styrene (ABS), poly methyl methacrylate (PMMA), or polybutylene terephthalate (PBT).

During making the antenna radiator 13, conductive ink is printed on one of the substrate layers 132 to form the conducting layer 136. The resistivity of the conductive ink is equal to or lower than $2.9 \sim 10 \times 10^{-8} \Omega \cdot m$ at 20° C. Then dielectric ink is printed on the surface of the conducting layer 136 to form the dielectric layers 134 with a number of through holes defined therein. The conductive ink is introduced through the through holes to form conductive portions for adjacent conducting layers 136 when another conductive layer 136 is printed and is formed on the dielectric layer 134. The processes of making the conducting layers 136 and the dielectric layers 134 described above are repeated until the conductive layers 136 form a predetermined radiator. The other substrate layer 132 is formed on the other side so that the antenna radiator 13 is formed, as shown in FIG. 3.

A first exemplary method for making the housing 10 may include the following steps.

Figure 4:
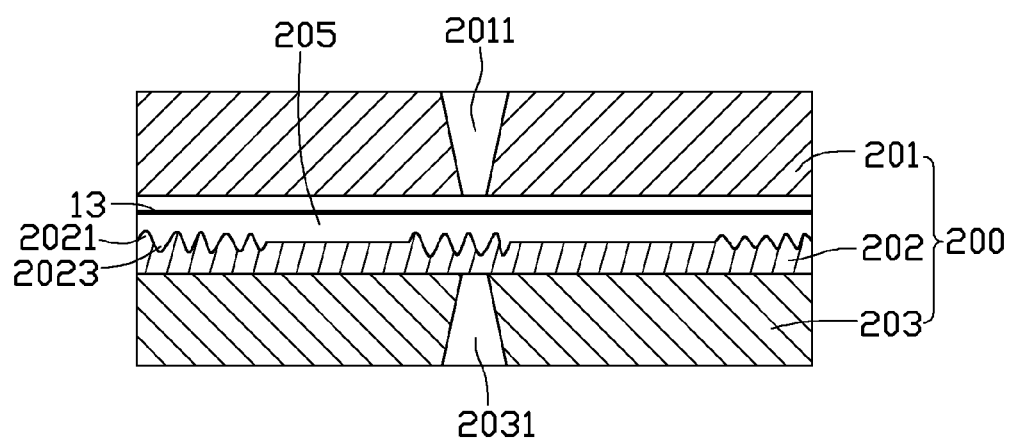
FIG. 4 is a cross-sectional view of the antenna radiator placed in a molding machine of making the housing of FIG. 1.

Referring to FIG. 4, an injection molding machine 200 is provided. The injection molding machine 30 is a double-shot molding machine and includes a first die 201, a second die 203, and a molding plate 202. A first runner 2011 is defined in the first die 201. A second runner 2031 is defined in the second die 203. A number of hills 2021 project from one surface of the molding plate 201. A valley 2023 is defined between each two adjacent hills 2021 so that the surface forms a pattern of a predetermined radiator.

Figure 5:
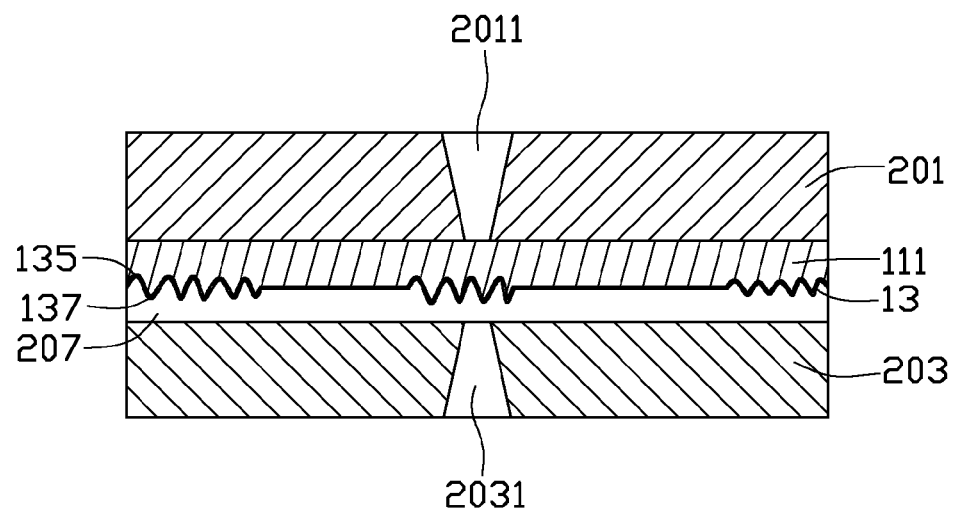
FIG. 5 is similar to FIG. 4, but showing a first injection layer formed.

Referring to FIGS. 4 and 5, a first injection chamber 205 is formed between the first die 201 and the molding plate 202. The antenna radiator 13 is placed into the first injection chamber 205. The moldable plastic is injected into the injection chamber 205 to form the first injection layer 111. When the first injection layer 111 is molded, the antenna radiator 13 is flexibly pushed to stick to the molding plate 202 so that a number of hills 135 and a number of valleys 137 between adjacent hills 135 are formed corresponding to the molding plate 202.

Figure 6:
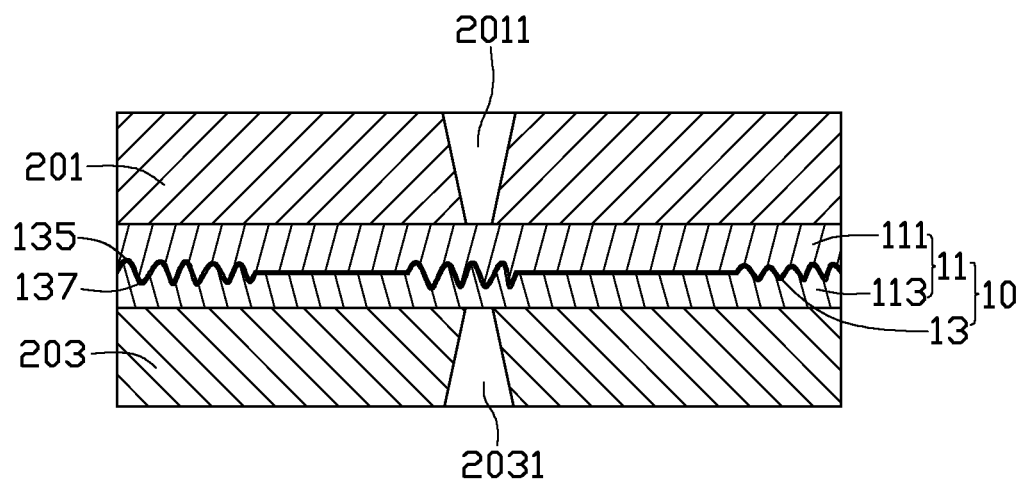
FIG. 6 is similar to FIG. 5, but showing a second injection layer formed and the antenna radiator sandwiched between the first, second injection layers.

Referring to FIGS. 5 and 6, the molding plate 202 is removed, and a second injection chamber 207 is formed between the antenna radiator 13 and the second die 203. The molded plastic is injected into the second injection chamber 207 to form the second injection layer 113. The second injection 113 buries the antenna radiator 13 and combines the first injection 111. Thus, the housing 10 is provided as shown in FIG. 1.

A second exemplary method of making the housing 10 is similar to the first method. However, in the second method, the molding plate 202 is fixed to the second die 203 and another injection molding machine is provided. After the first injection layer 111 is formed and combines with the antenna radiator 13, the first injection layer 111 together with the antenna radiator 13 are placed into the second injection molding machine, and the second injection layer 113 is injected to combine with the first injection layer 111 so that the antenna radiator 13 is sandwiched between the first and second injection layers 111 and 113.

The antenna radiator 13 is sandwiched between the first injection layer 111 and the second injection layer 113 so that the antenna radiator 13 is protected from being damaged. Additionally, the antenna radiator 13 is multi-layered so that the volume of the housing 10 can be less. The antenna radiator 13 is three dimensional using injection molding methods to improve characteristics of the antenna. In addition, the antenna radiator 13 can be directly attached to the housing 10, thus, the working efficiency is increased.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A housing comprising:
a base including a first injection layer and a second injection layer, the first and second injection layers formed by injecting of moldable plastic and combining to each other;
an antenna radiator sandwiched between the first and second injection layers by insert molding, the antenna radiator at least partly covered by the first and second injection layer, the antenna radiator including a plurality of hills and a plurality of valleys formed between adjacent hills, the antenna radiator including at least two conducting layers and at least one dielectric layer, adjacent conducting layers electrically connected to each other and being separated by the dielectric layer.

2. The housing as claimed of claim 1, wherein the conducting layers are formed by printing conductive ink, the resistivity of the conductive ink is equal to or lower than 2.9~10×10$^{-8}$Ω·m at 20° C.

3. The housing as claimed of claim 1, wherein the antenna radiator further includes two substrate layers, the substrate layers are oriented at opposite sides of the antenna radiator.

4. The housing as claimed of claim 3, wherein each substrate layer is made of arylonitrile butadiene styrene, poly methyl methacrylate, or polybutylene terephthalate.

5. The housing as claimed of claim 1, wherein the moldable plastic is one or more thermoplastic materials selected from a group consisting of polypropylene, polyamide, polycarbonate, polyethylene terephthalate, and polymethyl methacrylate.

6. The housing as claimed of claim 1, wherein the antenna radiator includes a first connecting port and a second connecting port, both the first and second connecting ports and run through the first injection layer and are exposed.

7. The housing as claimed of claim 1, wherein adjacent conducting layers are electrically connected to each other by conductive ink.

8. A housing comprising:
a base including a first injection layer and a second injection layer, the first and second injection layers formed by injecting of moldable plastic and combining to each other;
a three dimensional antenna radiator sandwiched between the first and second injection layers by insert molding, the antenna radiator at least partly covered by the first and second injection layer, the antenna radiator including at least two conducting layers and at least one dielectric layer, adjacent conducting layers electrically connected to each other and being separated by the dielectric layer.

9. The housing as claimed of claim 8, wherein the conducting layers are formed by printing conductive ink, the resistivity of the conductive ink is equal to or lower than 2.9~10×10$^{-8}$Ω·m at 20° C.

10. The housing as claimed of claim 8, wherein the antenna radiator further includes two substrate layers, the substrate layers are oriented at opposite sides of the antenna radiator.

11. The housing as claimed of claim 10, wherein each substrate layer is made of arylonitrile butadiene styrene, poly methyl methacrylate, or polybutylene terephthalate.

12. The housing as claimed of claim 8, wherein the moldable plastic is one or more thermoplastic materials selected from a group consisting of polypropylene, polyamide, polycarbonate, polyethylene terephthalate, and polymethyl methacrylate.

13. The housing as claimed of claim 8, wherein the antenna radiator includes a first connecting port and a second connecting port, both the first and second connecting ports and run through the first injection layer and are exposed.

14. The housing as claimed of claim 8, wherein adjacent conducting layers are electrically connected to each other by conductive ink.

* * * * *